Jan. 15, 1952 — W. STRAUSS — 2,582,891
AUTOMATIC MOLDING PRESS
Filed Dec. 8, 1949 — 9 Sheets-Sheet 1
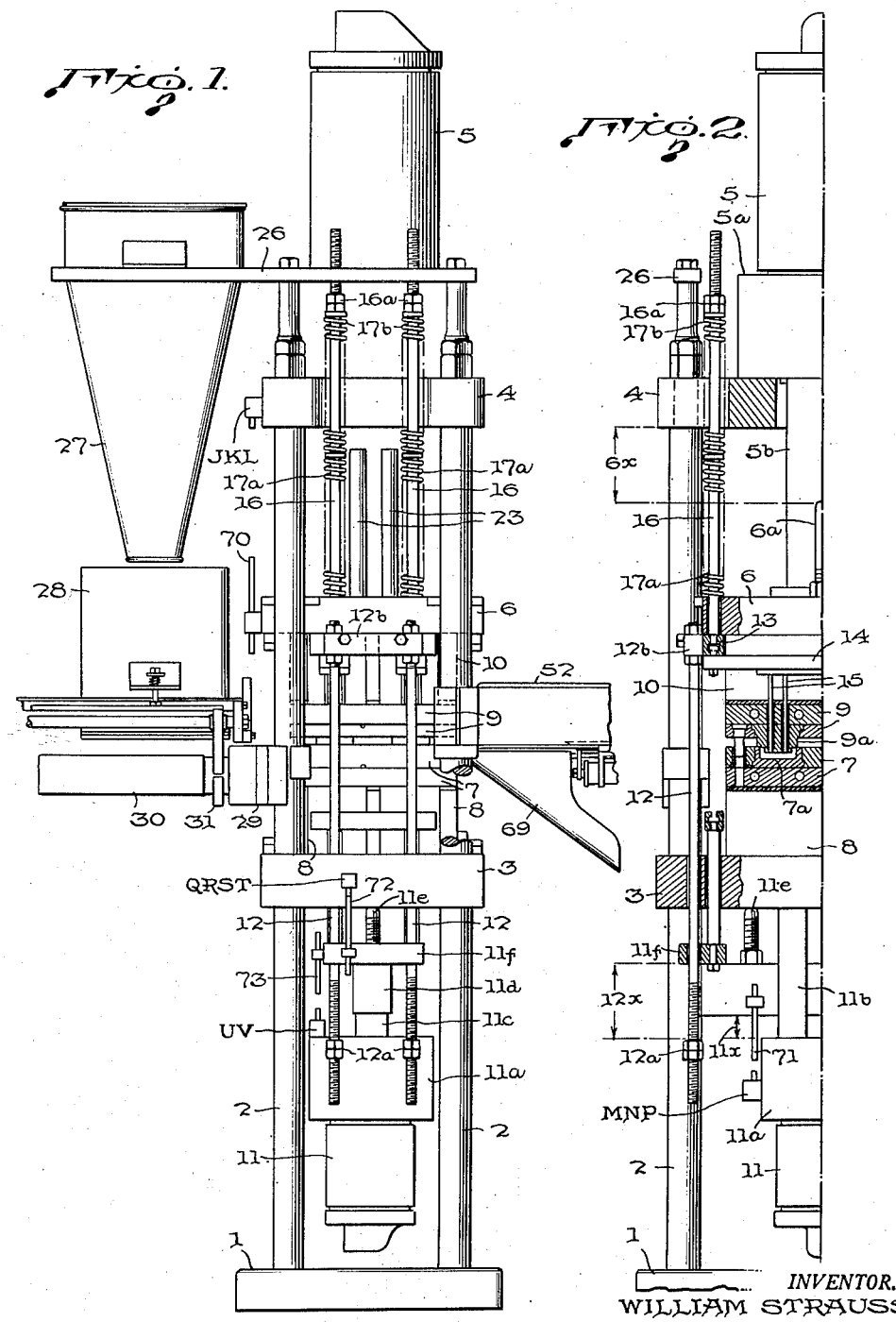
INVENTOR.
WILLIAM STRAUSS
BY
Ralph B. Stewart
ATTORNEY Jan. 15, 1952  W. STRAUSS  2,582,891
AUTOMATIC MOLDING PRESS
Filed Dec. 8, 1949  9 Sheets-Sheet 2
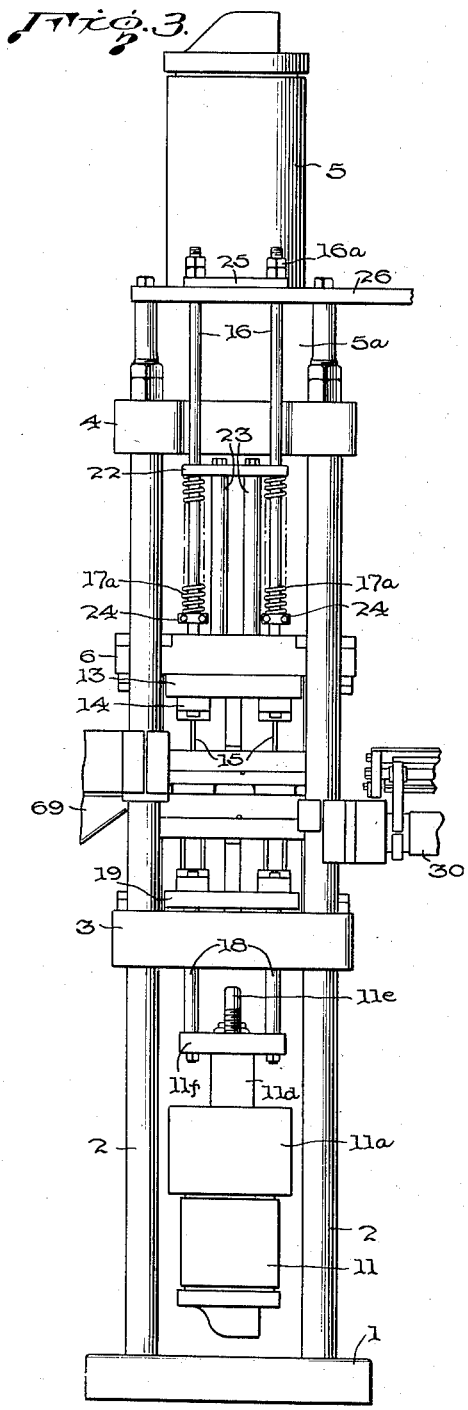
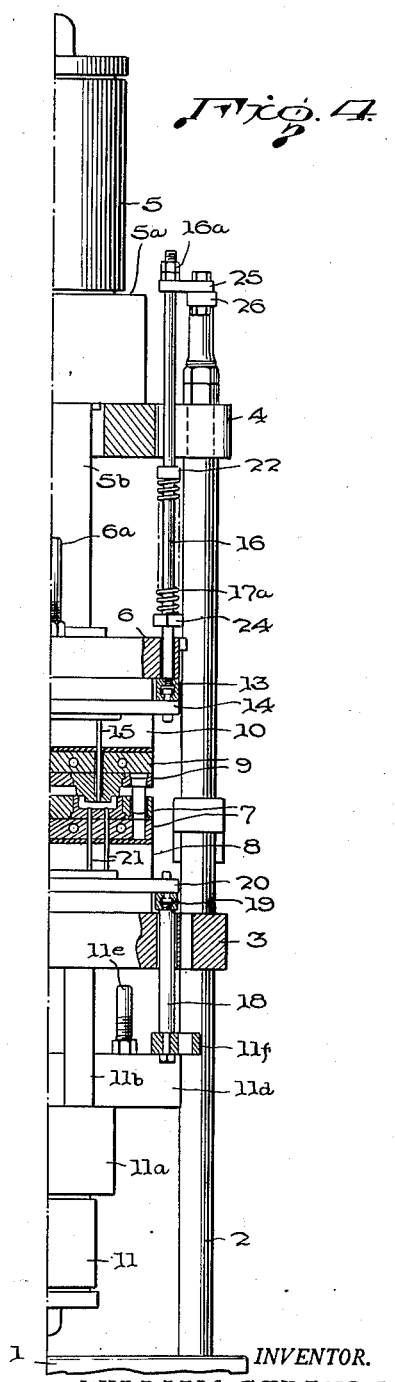
INVENTOR.
WILLIAM STRAUSS
BY
Ralph B. Stewart
ATTORNEY

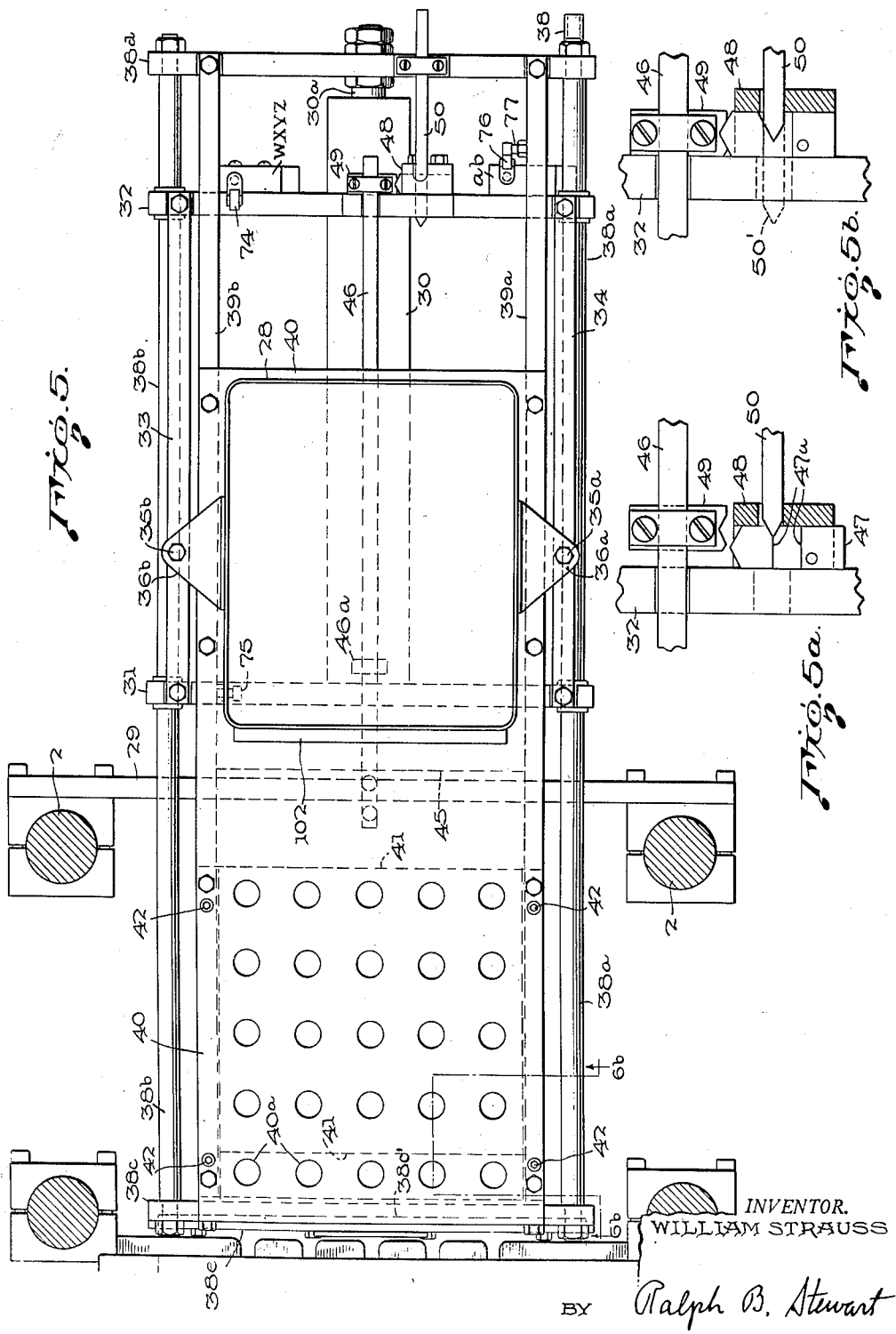

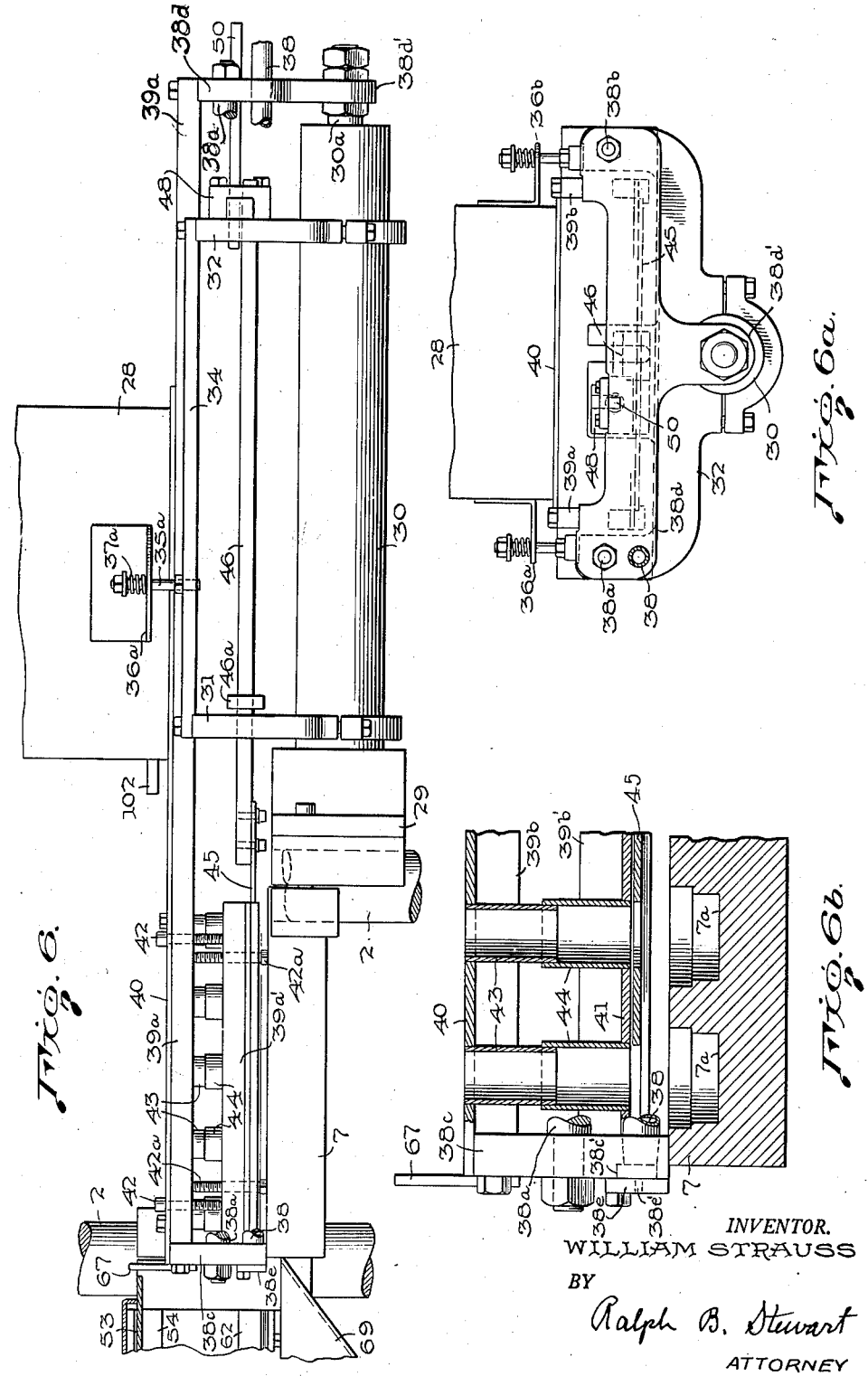

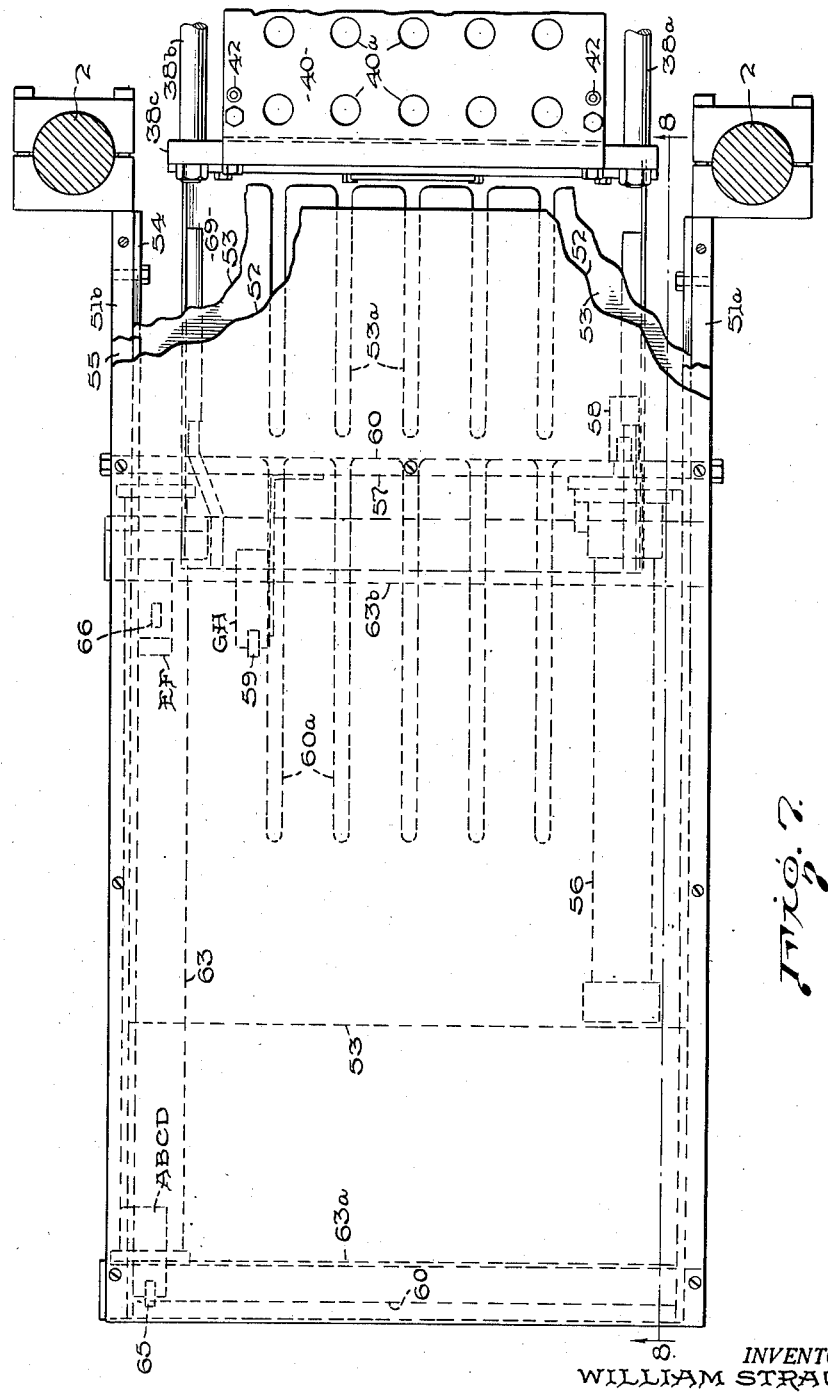

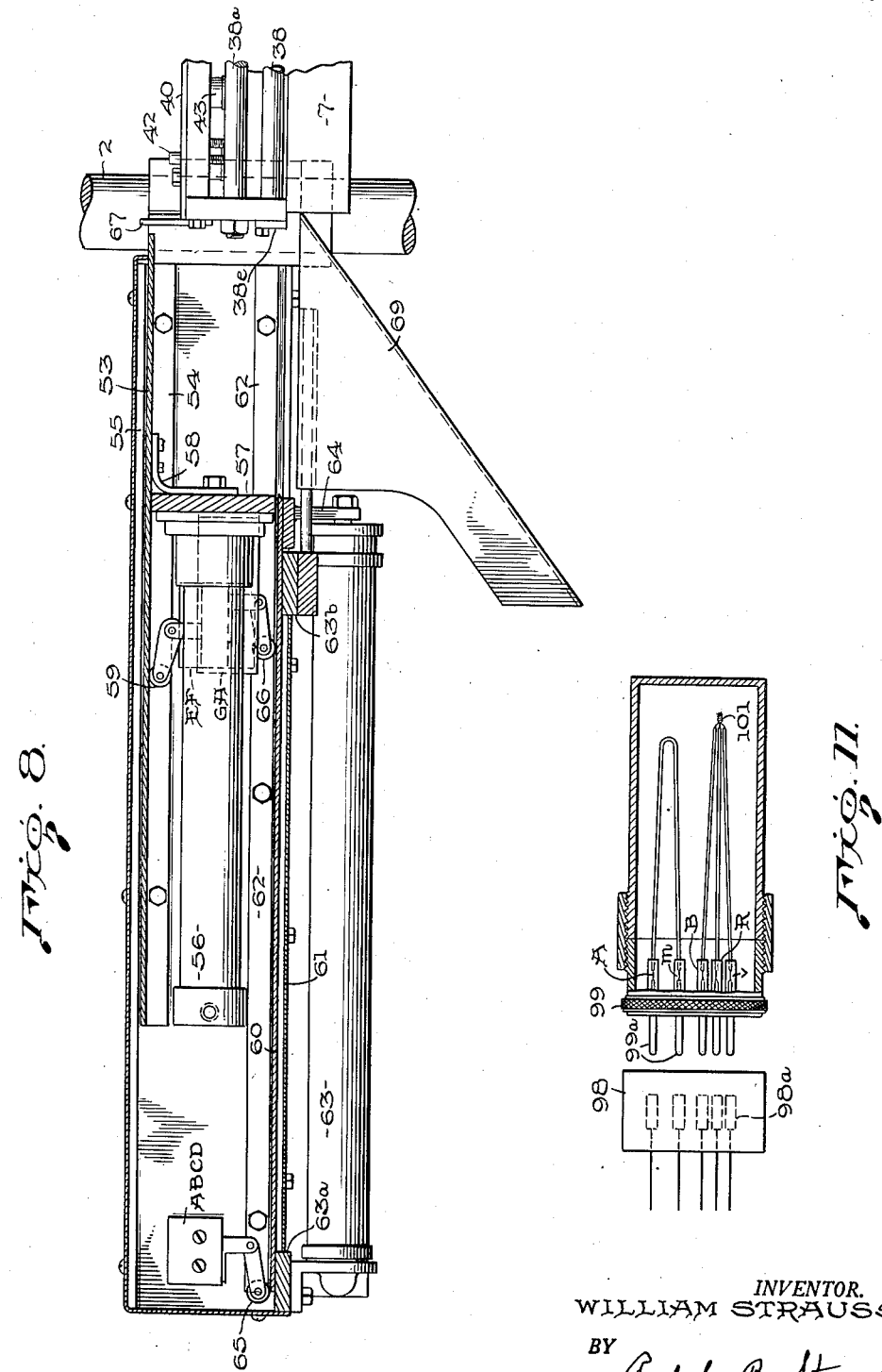

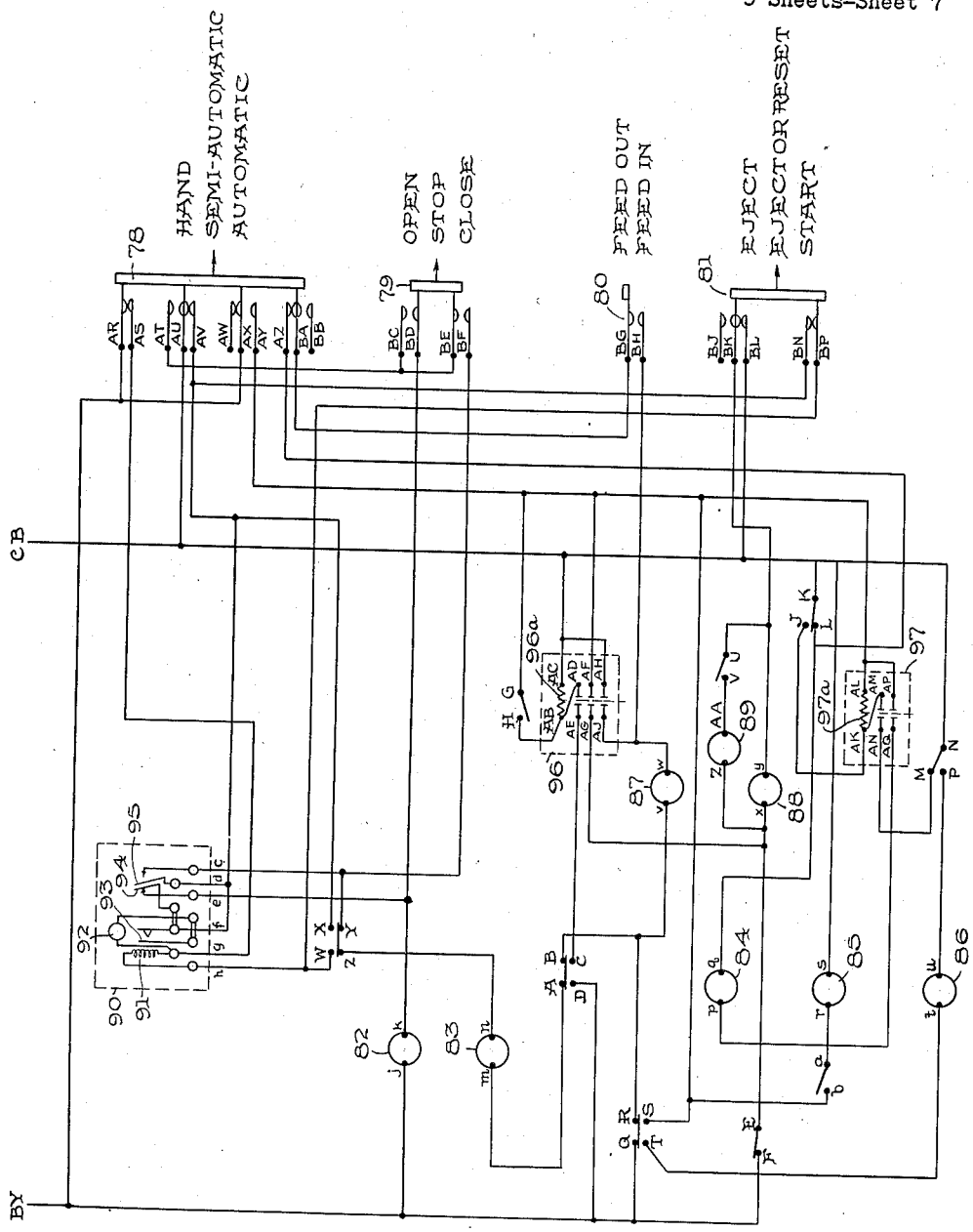

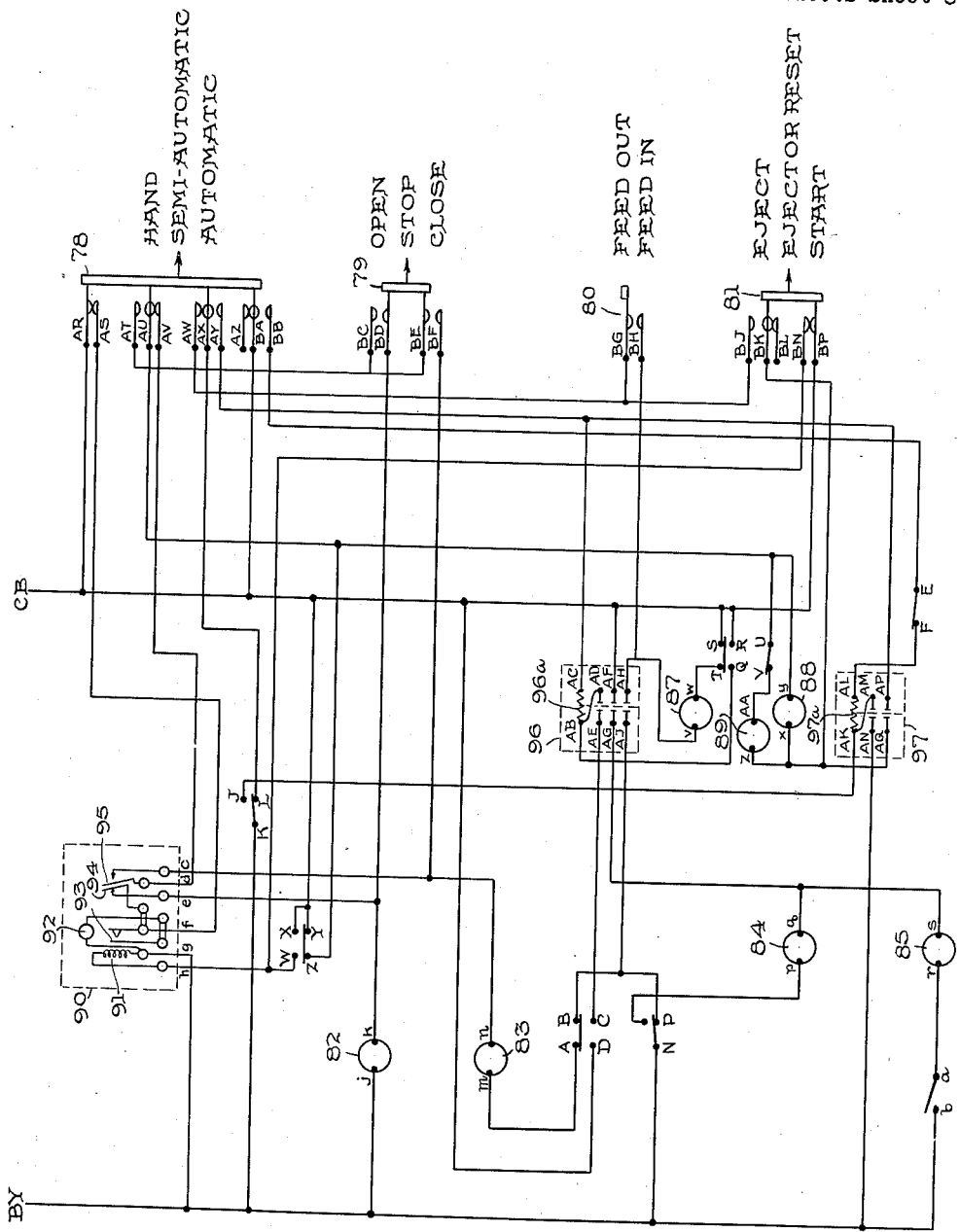

Jan. 15, 1952     W. STRAUSS     2,582,891
AUTOMATIC MOLDING PRESS
Filed Dec. 8, 1949     9 Sheets-Sheet 9
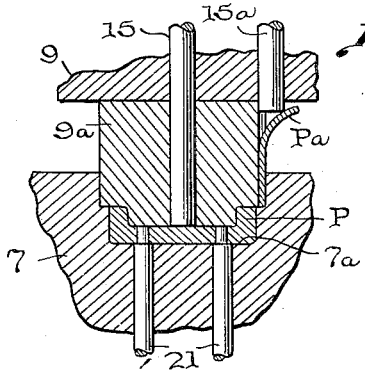
FIG. 12.
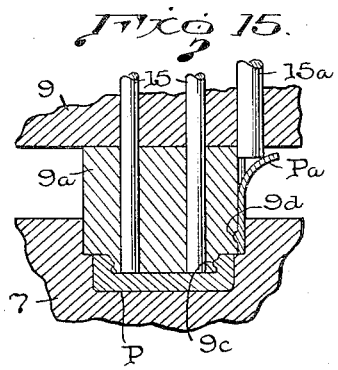
FIG. 15.
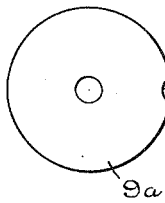
FIG. 12a.
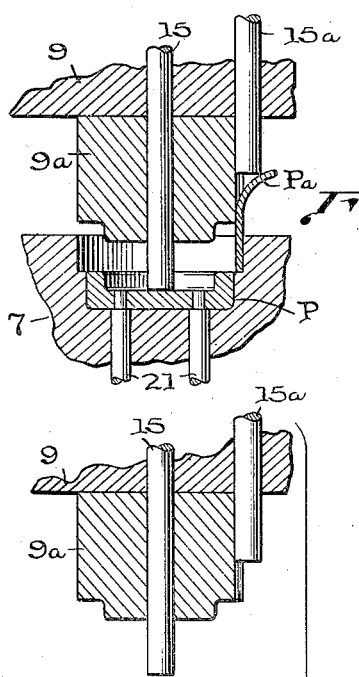
FIG. 13.
FIG. 14.
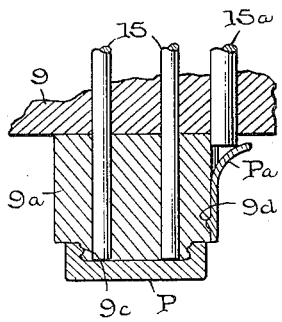
FIG. 16.
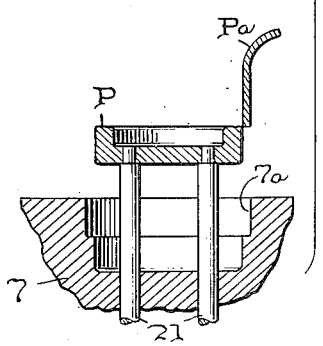
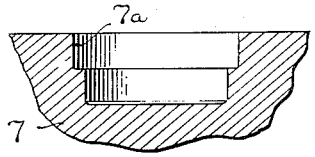
INVENTOR.
WILLIAM STRAUSS
BY Ralph B. Stewart
ATTORNEY Patented Jan. 15, 1952

2,582,891

UNITED STATES PATENT OFFICE 2,582,891

AUTOMATIC MOLDING PRESS

William Strauss, Philadelphia, Pa., assignor to F. J. Stokes Machine Company, a corporation of Pennsylvania Application December 8, 1949, Serial No. 131,757

21 Claims. (Cl. 18—16)

This invention relates to a molding press for molding articles from powdered molding material.

The invention is concerned especially with a molding press of the type in which powdered molding material is deposited in die cavities formed in a die plate and is compressed into form by a movable force plate carrying the forces which compress the material in the die cavities. A general object of the invention is to devise a press of general utility and being capable of a wide variety of operations.

In molding certain types of articles, it is preferable to have the molded articles remain in the die cavities when the press is opened, and the articles are then ejected from the die cavities by knock-out pins operated from below the die plate. For other types of articles, it is desirable to have the molded articles stick to the force elements when the press is opened, and the articles are then ejected by the operation of knock-out pins associated with the forces which are operated from above the plate. An object of my invention is to devise a press in which a single ejection cylinder is employed for operating either the lower knock-out pins or the upper knock-out pins so that the press may be used for the molding of either type of article.

In the operation of molding presses it is important that all of the molded articles and the flash formation incidental to such molding be removed from the press after each molding cycle and before the cavities are filled with molding material for another molding cycle. If this is not done, serious damage is likely to result from the high pressures developed in the press if one or more cavities contains more molding material than is required. In the present invention, this difficulty is avoided by the use of a slotted, comblike stripper plate arranged to be moved into the press to straddle the knock-out pins after the pins have removed the molded article from the cavities or from the forces. The stripper plate serves to strip the molded articles from the knockout pins when the pins are withdrawn to their normal position. Another object of my invention is to provide two stripping plates for the press with separate operating cylinders, one for use in top ejection and the other for use in bottom ejection. In the case of top ejection, the bottom stripper plate is replaced by a solid receiving plate which covers the cavities in the die plate before the stripping operation takes place.

Molding material is supplied to the cavities in the die plate from a fixed hopper mounted at one side of the press by means of a feeding board which contains a measuring cavity for each die cavity and is arranged to reciprocate between a loading position beneath the hopper to a discharging position above the die plate where the measured charges are discharged from the board into the respective die cavities. Another feature of the present invention is that on the inward stroke of the feed board from the hopper into the press, the front of the feed board is arranged to engage the leading edge of the lower stripper plate or comb and pushes the stripper comb out of the press. This insures that none of the molded pieces carried by the comb can fall off of the leading edge of the comb and into the cavities. After the comb has been moved out of the press, its operating cylinder is energized to withdraw the comb completely to its normal position, and in this further movement, the molded pieces are wiped from the comb and dropped into a container. The return of the feeding board to its loading position is controlled by the stripper comb in its normal position, and the second part of the comb return stroke, that is, when the comb is being operated under its own power, provides sufficient time delay in the return of the feed board for completing discharge of the molding material from the measuring cavities.

The feed board for the press includes a stop plate slideably mounted on the bottom of the board containing the measuring cavities and serving normally to close the bottom of each measuring cavity, but being provided with apertures which register with the bottom ends of the measuring cavities when the stop plate is moved from its normal position to discharging position. The stop plate moves with the feed board on the feeding stroke until the apertures in the stop plate come into registry with the die cavities, and then the motion of the stop plate is arrested while the feed board continues until the measuring cavities come into registry with the apertures in the stop plate. A further feature of the invention is the provision of a latching arrangement for stopping the movement of the stop plate at the proper time and for holding the stop plate in locked position on the return movement of the feed board until the plate closes the bottoms of the measuring cavities and then releasing the stop plate. This latching device is adjustable for operation with feed boards having measuring cavities of different diameters.

Still another object of the invention is to provide an electric control system for quickly converting the press from top ejection operation to bottom ejection operation. Broadly, this is accomplished by providing an electric control for each operating part of the press and connecting each terminal of each control to individual connectors in an electric socket. The necessary connections between the different terminals of the various electric controls are completed through a plug of the "Cannon" type having pins which engage the connectors in the socket, and appropriate jumper connections are made between different pins on the plug to secure the desired operation. Accordingly, one jumper plug is provided for top ejection operation, and another jumper plug is provided for bottom ejection operation.

Still another object of the invention is to provide safety interlocks to prevent the operation of one movable part unless all other movable members are in their proper positions.

My invention also includes a novel method and arrangement for controlling the formation of flash on the molded pieces and for ejecting and discharging the flash from the press.

The preferred embodiment of the invention is illustrated in the accompanying drawing in which Figure 1 is a side elevation of the press set up for top ejection operation, with end portions of the press feeding arrangement and the stripper comb assembly being broken away;

Figure 2 is an elevational view of Figure 1 as seen from the right of this figure but showing only the left half of the press, certain parts being omitted and other parts being shown in section;

Figure 3 is a side elevation of the press similar to Figure 1 but showing the press set up for bottom ejection operation, this view being taken from the opposite side of the press from that of Figure 1;

Figure 4 is an elevational view of Figure 3 as seen from the left of this figure but showing only the right half of the press with certain parts omitted and other parts shown in section;

Figure 5 is a plan view on a larger scale of the mold feeding arrangement mounted to the left of the press as shown in Figure 1 and to the right in Figure 3;

Figures 5a and 5b are plan views on a still larger scale of the latch device controlling the stop plate in the feed board, Figure 5b showing the latch in closed position;

Figure 6 is a side elevation of the mold feeding arrangement of Figure 5;

Figure 6a is an end view of Figure 6 taken from the right;

Figure 6b is an enlarged fragmentary sectional view of Figure 6 taken along line 6b—6b of Figure 5 and showing the internal construction of the feed board;

Figure 7 is a plan view on the same scale as Figure 5 of the stripper comb assembly mounted on the right of the press as shown in Figure 1 and on the left as shown in Figure 3;

Figure 8 is a sectional view of Figure 7 taken along the line 8—8;

Figures 9 and 10 are diagrams of the control circuit for top ejection operation and bottom ejection operation, respectively;

Figure 11 illustrates a connector socket provided with replaceable jumper plugs for quickly changing the connections from Figure 9 to Figure 10 or vice versa; and Figures 12 to 16 illustrate how the flash formations on the molded pieces are formed and ejected.

Referring to Figures 1 and 2 of the drawing which show the press set up for top ejection operation, the press is provided with a suitable base 1 on which four vertical standards or tie rods 2 are supported. The lower platen 3 of the press is supported in fixed position on the tie rods 2, and the upper ends of the tie rods are secured to a cross-head 4 which supports an upper cylinder 5 having a head 5a resting upon the member 4 and a piston rod or ram 5b extending downwardly through the cross-head 4 and having the upper platen 6 of the press secured to the lower end thereof. The tie rods 2 serve as guides for the platen 6 in its vertical movement. A two-part, heated die plate 7 having a plurality of die cavities 7a is supported upon the lower platen 3 by suitable spacer blocks 8. A two-part heated force plate 9 is supported on the lower face of movable platen 6 by suitable spacer blocks 10. Plate 9 carries a plurality of forces 9a which compress the molding material into the die cavities 7a.

An injection cylinder 11 having a head 11a is supported from the lower platen 3 by suitable rods 11b (see Figure 2), and the ejection ram 11c is provided with a cross-head 11d at its upper end which is provided with an adjustable stop 11e for engaging the lower face of platen 3. A pair of cross-arms 11f are provided at the two ends of the cross-head 11d, and these cross-arms are provided with apertures at each end for slideably receiving ejection rods 12 having stop nuts 12a adjustably mounted on the lower end thereof and being secured at their upper ends to bars 12b removably secured to a pair of slotted rails 13 mounted below the side edges of movable platen 6. An ejection cross-head 14 is arranged within the space between spacer blocks 10 and is supported at opposite ends by the slotted rails 13. Ejection pins 15 are supported by the cross-head 14 and extend downwardly through the force plate 9 and into the forces 9a. The slotted rails 13 which support the knock-out plate 14 are secured to the lower ends of four vertical guide rods 16 which pass upwardly through apertures in movable platen 6 through the recessed edges of cross-head 4. The knock-out plate 14 is normally held in its upper position by compression springs 17a and 17b mounted on each of the guide rods 16 and held under compression by the stop nuts 16a adjustably mounted on the upper ends of the rod 16. These springs normally hold the knock-out plate 14 seated against the lower face of movable platen 6.

In operating the press for top ejection, the press is set up as shown in Figures 1 and 2. Normally the ejection cylinder 11 is energized to hold the ejection cross-head 11d in its upper position with the stop 11e engaging the lower face of the fixed platen 3. After each molding cycle, the upper platen 6 is raised vertically upward through a distance 6x which is determined by the stop 6a carried by the platen 6 and arranged to engage the lower face of cross-head 4. The stop nuts 12a carried by ejection rods 12 are positioned below the lower face of the cross-arms 11f by a distance 12x which is equal to the distance 6x, so that when the upper platen 6 is raised to open the press, the stop nuts 6a come into engagement with the cross-arms 11f. Thereafter, ejection cylinder 11 is energized to move the ejection cross-head 11d and the cross-arms 11f downwardly a distance 11x, which movement operates the knock-out pins 15 downwardly to break the molded articles from the ends of the forces 9a. As will be described later, the upper stripper comb is then moved into position before the knock-out pins 15 are returned to their normal position.

Figures 3 and 4 show the same press as Figures 1 and 2 but set up for bottom ejection operation, Figure 3 being a view of the opposite side of the press from that of Figure 1. The main construction of the press has already been described above. For bottom ejection operation, the pull-down rods 12 are not required and are removed. Instead, four push rods 18 are mounted on the cross-arms 11f and extend upwardly through holes in the platen 3 and support two slotted rails 19 which support a lower knock-out plate 20 carrying knock-out pins 21. For bottom ejection, knock-out cylinder 11 is normally de-energized so that the cross head 11d is in its lower position and the knock-out pins 21 are in their normal position with the ends thereof flush with the bottoms of the die cavities. When the articles are to be ejected, the cylinder 11 is energized to move the knock-out pins upwardly until the stop 11e comes into contact with the platen 3.

For the purpose of making certain that the molded articles remain in the die cavities and do not stick to the forces, the pins 15, which in Figures 1 and 2 serve a knock-out function, are now employed as hold-down pins to hold the articles in the die cavities during opening of the press. For this purpose, the rods 16 which support the plate 14 pass through apertures formed in a cross-bar 22 supported upon vertical rods 23 extending upwardly from the movable platen 6. Cross-bar 22 serves as a seat for the upper ends of compression springs 17a, the lower ends of these springs bearing against seating collars 24 secured to the rods 16, the arrangement being such that the springs 17a normally urge the hold-down pins 15 downwardly. The upper compression springs 17b shown in Figures 1 and 2 are omitted, and the upper ends of rods 16 pass through apertures formed in a suitable plate 25 supported on the hopper supporting arms 26 which are mounted across the upper ends of tie rods 2. Stop nuts 16a carried on the upper ends of rods 16 serve to hold the hold-down pins 15 in their lowermost position. The seating collars 24 for compression springs 17a are spaced above the upper surface of platen 6 a distance sufficient to allow complete separation of the forces from the molded articles before the platen engages the collars 24. Thereafter, the hold-down pins 15 are raised with further upward movement of the platen 6, and the ejection cylinder 11 is then energized to operate the lower ejection pins 21 to remove the molded articles from the die cavities.

The arrangement for feeding molding material to the die cavities includes a hopper 27 supported upon parallel arms 26 and being positioned to discharge powdered molding material into a container 28 mounted on a fixed support in front of the press. The container 28 is open both at the top and at the bottom, but the bottom of the container rests upon a sliding feed board arranged to slide from a loading position beneath the container into a discharging position in the press. The feeding arrangement is supported upon a frame-work including a cross-bar 29 secured across the front pair of tie rods 2. This bar supports a horizontal cylinder 30 which in turn supports a pair of transverse brackets 31 and 32 which carry at their ends a pair of parallel bars 33 and 34. A pair of pins 35a and 35b are supported on bars 33 and 34 and extend upwardly through apertures formed in laterally extending ears 36a and 36b secured to container 28. These pins serve to hold the container 28 against sliding with the feed board, and springs 37a and 37b mounted on these pins and seated on the ears serve to press the container into contact with the feed board.

The feed board is supported upon a sliding carriage formed of a pair of parallel rods 38a and 38b passing freely through aligned apertures formed in the ends of transverse brackets 31 and 32 and having cross-heads 38c and 38d secured to the ends thereof. Rods 38a and 38b are shown in full in Figure 5, but only the two end portions of rod 38a are shown in Figure 6, the middle portion being broken away to show other parts. The feed board is carried by cross-heads 38a and 38b by means of a pair of parallel bars 39a and 39b arranged inside of the bars 33 and 34.

The feed board is formed of an upper horizontal plate 40 carried by parallel bars 39a and 39b. The forward end of plate 40 is provided with a plurality of apertures 40a equal in number to the number of die cavities provided in die plate 7 and being arranged to have vertical alignment with the die cavities when the board is in its forward position. The rear end of the plate 40 is solid and imperforate and extends underneath the container 28 to close the bottom of the container when the feed board is moved into the press. The feed board also includes a lower perforated plate 41 having perforations in alignment with the perforations in the plate 40. This plate is secured to the bottom edges of a pair of parallel bars 39a' and 39b' arranged immediately below bars 39a and 39b, and the plate 41 is suspended from the bars 39a and 39b by four screws 42 Figure 6 passing through the upper bars and having threaded engagement with the lower bars. Each aperture in the loading board is provided with a measuring cavity formed of an upper tube 43 supported in the aperture of plate 40 and a lower tube 44 telescoping with the tube 43 and supported in the aperture of plate 41.

The volume of the measuring cavities may be adjusted by turning screws 42 to raise or lower the lower tube plate 41 with respect to the tube plate 40, and thereby adjust the amount of telescoping of the tubes 43 and 44. Suitable jack screws 42a may be threaded through the lower bars 39a' and 39b' and abut against the upper bars 39a and 39b for holding the upper and lower tube plates separated by the proper distance.

The feeding board also includes a stop plate 45 slideably mounted immediately below the lower tube plate 41 and provided with apertures which register with the lower ends of the tubes 44 when the stop plate is in the discharging position, but normally the plate 45 is positioned so that solid portions thereof close the lower ends of the tubes 44. Stop plate 45 is provided with a tail piece in the form of a bar 46 which extends rearwardly beyond the bracket 32 and cooperates with a latching device carried by this bracket as will be explained later. A stop collar 46a is mounted on the bar 46 and engages the forward bracket 31 to limit the forward movement of the stop plate.

The stop plate 45 moves with the feed board as the board moves out of the press and underneath the container 28 where molding material from the container fills the measuring cavities of the board. On each feeding operation, the board is moved forward into the position shown in Figure 5, and the stop plate 45 is carried along with the board until the apertures in this plate come into registry with the die cavities, and at this point, the stop plate is locked in fixed position by means of a latch mounted on bracket 32 and co-operating with the tail piece 46. The stop plate is held stationary while the feed board continues to move until the measuring cavities are in registry with the die cavities at which time the measured quantities of molding material are discharged through the lower end of the measuring cavities into the die cavities. On the return movement of the feed board, the stop plate 45 remains stationary until the feed board is moved out of the press a short distance sufficient for the stop plate to cover the bottom ends of the measuring cavities, and then the stop plate is unlatched so that it is carried along with the feed board for the remainder of the return stroke.

The latch arrangement for locking the stop plate in fixed position is illustrated on a larger scale in Figures 5a and 5b. The latch consists of a sliding bolt 47 mounted to slide within a housing 48 secured to the bracket 32. The end of the bolt facing the tail piece 46 is pointed and is adapted to enter a V-shaped notch formed in the end of a latch block 49 adjustably secured to the tail piece 46. The tail piece slides within a notch formed in the upper edge of bracket 32 so that the notched end of block 49 moves transversely of the pointed end of the bolt 47. The latch bolt is normally pushed away from the block 49 and is operated towards the block 49 by means of a pointed latch bolt 50 adjustably secured to the carriage cross-head 38d and arranged to pass through aligned apertures formed in the latch housing 48 and in the supporting bracket 32. The latch bolt 47 also has a slot 47a formed therein through which the bolt 50 may pass, and this slot is normally displaced with respect to the axis of the bolt 50 in the manner shown in Figure 5a, but is moved into the latching position shown in Figure 5b by the tapered end of the bolt 50 as the bolt moves into the slot 47a.

It will be understood that when the feed board is in loading position beneath the container 28, the bolt 50 is withdrawn from the latch and the latch bolt 47 is in released position. As the feed board moves forward, the stop plate 45 and the tail piece 46 move with the board until the latch block 49 and the bolt 50 reach the position shown in Figure 5a, and beginning at this point the latch bolt 47 begins to move into latching position, and by the time the bolt 50 has reached the position shown in solid lines in Figure 5b the latch bolt 47 has reached full latched position, and the stop plate remains fixed for the remainder of the movement of the feed board. During this further movement, the operating bolt 50 continues through the aperture formed in bracket 32 and at the end of the stroke of the feed board it has reached the position shown in dotted lines at 50' in Figure 5b. On the return stroke of the feed board, the latch remains locked until the operating bolt 50 is withdrawn from engagement with the latch bolt 47, and from this point on the stop plate moves with the feed board. The latch block 49 is adjustable along tail piece 46, and the operating bolt 50 is adjustable in position lengthwise on supporting cross-head 38d, to accommodate different sizes and spacings of die cavities in the die.

The feed board carriage is reciprocated by cylinder 30, a piston rod 30a of which is connected to a depending lug 38d' on the carriage cross-head 38d. The cylinder 30 is a double-acting cylinder and preferably is operated by fluid under pressure supplied through an electrically controlled four-way valve which is normally biased to a position to hold the feed board in loading position.

A compressed air pipe 38 is mounted upon the feed board carriage and reciprocates with the carriage, the rear end of the pipe being supported by cross-head 38d and the front end of the pipe being screwed into cross-head 38c. In Figure 6 only the two end portions of pipe 38 have been shown, the central portion being cutaway for showing other parts. A groove 38c' is cut across the front face of the cross-head 38c and communicates with the end of pipe 38 but is closed at both ends. A nozzle plate 38e is arranged to cover the groove 38c' and is provided with a plurality of nozzle openings 38e' communicating with the groove 38c' and through which streams of compressed air are directed across the face of the die plate at an appropriate time to blow away loose flash as will be explained later. For top ejection operation, the nozzle plate 38e is replaced by another plate having greater vertical height and appropriate nozzle openings are formed in the forward face for directing streams of air across the face of the upper die plate for the same purpose. The right end of pipe 38 is connected by a flexible hose to a suitable source of compressed air, and the supply line is provided with an electrically controlled valve.

The stripper comb assembly, embodying an upper comb for use in top ejection and a lower comb for use in bottom ejection, is mounted to the right of the press as shown in Figure 1 and to the left as shown in Figure 3, and is illustrated in detail on a larger scale in Figures 7 and 8. The comb assembly is supported on a pair of horizontal bars 51a and 51b secured to the rear pair of tie rods 2 and extending in parallel relation rearwardly of the press. The assembly is provided with a removable cover 52 which is shown broken away at the two forward corners in Figure 7.

A comb plate 53 for top ejection is mounted in the top of the comb assembly for sliding movement into and out of the press. The lateral edges of the comb 53 project into guiding slots or grooves formed in the frame structure, for example, the comb 53 may rest upon a pair of rail pieces 54 secured to the inside faces of bars 51a and 51b, and hold-down strips 55 may be attached to the upper edges of these bars and extend over the lateral edge portions of the comb 53. The comb plate 53 is slotted at its forward end by a number of parallel slots 53a which are arranged in alignment with the rows of upper knock-out pins 15.

The upper comb 53 is shown in its normal or retracted position in Figures 7 and 8, and is moved into its operative position by means of a fluid-pressure actuated cylinder 56 mounted below the comb and supported at its forward end upon a transverse bar 57 supported by and between the side bars 51a and 51b. The piston rod for the cylinder 56 extends through the bar 57 and is connected to the comb 53 by an angle piece 58. Cylinder 56 is a single-acting cylinder operated from a suitable source of fluid under pressure, such as compressed air, and supplied through an electrically controlled valve which is normally biased to cutoff position. A control switch GH is mounted below comb plate 53 and is provided with an operating cam roller 59 engaging the underface of comb 53. This switch is normally open and is closed only when the comb 53 moves into its operative position where the roller 59 rides off of the comb and closes the switch.

The lower comb plate 60 is mounted for sliding movement in the lower part of the comb assembly, and this comb plate is shown in its retracted position in Figures 7 and 8. Comb 60 is supported upon a pair of rail pieces 61 secured to the lower edges of side bars 51a and 51b and extending over the lateral edges of comb plate 60, and two hold-down strips 62 are secured to the inner faces of bars 51a and 51b just above the comb plate 60. The forward edge portion of comb plate 60 is slotted by a plurality of parallel slots 60a arranged in alignment with the rows of lower knock-out pins 21.

Lower comb 60 is shifted from its normal to its operative position by means of a fluid pressure actuated cylinder 63 mounted below a side portion of the comb plate 60 and supported upon a pair of transverse bars 63a and 63b mounted across side bars 51a and 51b. The piston rod of cylinder 63 is connected to comb plate 60 by a bracket 64 extending downwardly from the front end of the plate. Cylinder 63 is a double-acting cylinder controlled by two 3-way valves provided with two control magnets. A control switch ABCD is mounted in the rear end of the comb assembly and has an operating cam roller 65 positioned to bear against the extreme rear edge portion of the plate 60 so as to operate the switch as soon as the plate begins to move towards its operative position. A second control switch EF is mounted towards the forward end of plate 60 and is provided with an operating cam roller 66 engaging the plate 60 at a point such that the roller rides off of the plate just before it reaches its operative position.

A vertical plate 67 is secured to the forward end of the feed board and extends upwardly into the path of upper comb 53 for the purpose of returning the comb 53 to its normal position by the inward movement of the feed board from its loading position to its discharging position.

A second plate 38e is secured along the lower edge of the front of the feed board in a position to engage the front edge of the lower comb plate 60 for the purpose of starting the return movement of the lower comb plate 60 by the movement of the feed board. After the feed board reaches its discharging position, the lower comb plate 60 is returned to its normal position by the action of cylinder 63 as will be explained later. Transverse bar 57 extends down to the upper surface of the comb plate 60 and serves to scrape the molded articles from the comb plate as it is withdrawn from the press, and these molded articles drop down into an inclined chute 69 positioned below the comb assembly in the space between the front of the comb plate 60 and the front edge of the feed board.

In the operation of the press, the various movable parts are operated automatically in a predetermined sequence by means of a number of electric switches including switches ABCD, EF and GH already described. The manner in which these switches and electric control elements are connected will depend upon the type of ejection used. Figure 9 shows the circuit connections for operation with top ejection, and Figure 10 shows the circuit for bottom ejection, the various switches being shown in the positions they would assume when the press is open, with combs, feed device and ejector mechanism all in their returned positions.

The same control switches are employed in the two circuits as follows: Switch ABCD, already described, is a double-throw switch with contacts C and D normally closed. This switch is operated by the lower comb plate 60 in its fully "out" position to open contacts CD and to close contacts AB. Switch EF is a single-throw, normally open switch which is held closed by the lower comb plate 60 but is operated to open position when the comb plate is moved into the press. Switch GH is a single-throw, normally open switch which closes when its roller 59 rides off of the upper comb 53, that is, when the upper comb is in its operative position in the press. Switch JKL is a double-throw switch with contacts JK normally closed. As shown in Figure 1, this switch is mounted on cross-head 4 and is operated by a rod 70 adjustably mounted upon movable platen 6. When the platen 6 is in its upper position, switch JKL is operated to close contacts KL.

Switch MNP is a double-throw switch with contacts M and N normally closed. As shown in Figure 2, this switch is mounted on a fixed part of the press, such as the head 11a of the ejection cylinder 11 and is operated by means of push rod 71 adjustably carried by the ejection cross-head 11d. When the cross-head is in its lower position, switch MNP is operated to close contacts PN.

Switch QRST is a double-throw switch with contacts T and S normally closed. As shown in Figure 1, this switch is mounted upon a fixed part of the press such as the lower platen 3 and is operated by a push rod 72 adjustably mounted upon a part of the ejection systems such as the cross-arm 11f. When the ejection cross-head is in its upper position, switch QRST is operated to close contacts Q and R.

Switch UV for controlling the air jet is a single-throw normally open switch and is operated to closed position when the ejector piston is in its down position. As shown in Figure 1, this switch is mounted on the ejection piston head 11a and is operated by a push rod 73 adjustably carried by the ejection cross-arm 11f.

Switch WXYZ is a double-throw switch with contacts W and X normally closed. As shown in Figure 5, this switch is mounted upon bracket 32 of the feed assembly, and has a cam roller 74 arranged to be operated by a screw 75 which extends inwardly from the feed board bar 39b. When the feed board is withdrawn from the press and is in loading position under the container 28, switch WXYZ is operated to open the contacts W and X and to close the contacts Y and Z.

Switch ab is a single-throw normally open switch mounted on bracket 32 of the feed assembly having an operating arm 76 positioned to be operated by a screw 77 extending inwardly from the feed board bar 39a, see Figure 5. When the feed board is in the discharging position as shown in Figure 5, the switch ab is operated to closed position.

In addition to the automatic switches just described, four hand-operated switches are employed in both Figures 9 and 10 as follows: Switch 78 is a three-position switch having eleven contacts and being movable to one position for effecting hand control of the press. The middle position is for semi-automatic operation and the other end position is for automatic operation. The switch 79 is a three-position switch having four contacts for closing or opening the press by manual control of the switch. Switch 80 is a two-position switch having two contacts for the manual control of the operation of the feed board. Switch 81 is a three-position switch having five contacts for the manual control of the ejection ram. The various contacts of the four switches are appropriately marked with identifying characters as shown in the drawing.

The press is opened by energizing valve magnet 82 having terminals $j$ and $k$ and is closed by valve magnet 83 having terminals $m$ and $n$. The lower comb is moved into the press by valve magnet 84 having terminals $p$ and $q$ and is moved out of the press by valve magnet 85 having terminals $r$ and $s$.

The upper comb is moved into the press by valve magnet 86 having terminals $t$ and $u$, and is moved out of the press by movement of the feed board.

The feed board is moved into the press by energizing valve magnet 87 having terminals $v$ and $w$, and is automatically returned when this magnet is de-energized.

Valve magnet 88 having terminals $x$ and $y$ operates the valve which controls ejection cylinder 11. This valve is normally biased to hold the ejection ram in its lower position, and energization of magnet 88 operates the valve to move the ram to its upper position.

Valve magnet 89 having terminals $z$ and AA operates the valve controlling the compressed air line leading to pipe 36. This valve is normally closed and is opened by magnet 89 which is connected in series with switch UV and in shunt to magnet 88.

A timing switch 90 is provided for determining the time the press remains closed for curing the molded articles and is provided with terminals marked $c$, $d$, $e$, $f$, $g$ and $h$, respectively. The timer is of known construction and will be described only briefly. It includes a clutch coil 91, a timing motor 92 and three movable switch contacts 93, 94 and 95. Contact 93 is normally biased to a position for connecting the motor 92 to the terminal $f$, and contacts 94 and 95 are normally biased towards the right in Figures 9 and 10, breaking the connection between terminals $e$ and $f$ and closing the connection between $c$ and $d$. When coil 91 is energized, contacts 93, 94 and 95 are moved to the left. Also, these contacts are moved to the left position by motor 92 at the end of the timing period and are mechanically held in this position until coil 91 is reenergized. Any other suitable form of timer may be employed.

An electromagnetic switch 96 is provided for controlling the circuit of the feed board magnet 87. This switch has an operating coil 96a provided with terminals AB and AC, and with three pairs of cooperating contacts AD—AE, AF—AG and AH—AJ. Terminals AB and AD are permanently connected together in a holding circuit for the relay including contacts AD and AE and switch contacts C and D of the lower comb switch ABCD.

An electromagnetic switch 97 is provided to perform different control operations in Figures 9 and 10. This switch has an operating winding 97a provided with terminals AK and AL, a pair of holding contacts AM and AN and a pair of control contacts AP and AQ. In Figure 9 this relay is energized by a switch JKL when the press is in open position and is held energized through a holding circuit completed through switch MNP when the ejector ram is in its lower position. The control contacts of the switch energize magnet 84 for moving the lower comb into the press.

In Figure 10, the winding of switch 97 is energized through switch JKL when the press is open and through switch EF when the lower comb is out of the press. The control contacts of the switch energize the ejector magnet 88 to operate the ejector ram to its upper position.

For the purpose of quickly changing the control circuit from that of Figure 9 to that of Figure 10 and vice versa, connections are brought out from the terminals of each electric unit to a connector socket 98 shown in Figure 11 having contact sockets 98a equal in number to the total number of terminals for the various units, and the various connections to establish the arrangement shown in Figure 9 are completed by means of jumper connections on a plug 99 which fits into the socket 98 and is provided with contact pins 99a which engage the contact sockets 98a. In Figure 11, only five sets of contact sockets and pins have been shown for the purpose of illustration, but it will be understood that a contact socket and pin will be provided for each terminal of each electric unit. By way of illustrating the jumper connections, a jumper wire 100 is shown connecting the pin A with the pin $m$. When the plug is in the socket, this jumper connection establishes connections between the terminal A of the lower comb switch ABCD and the terminal $m$ of the press operating magnet 83. Where more than two contact pins are to be connected together, leads from the various pins are brought out and twisted together as shown at 101 where leads from pins B, R and $v$ are connected together, thus establishing connections between the terminal B of switch ABCD, the terminal R of the ejector switch ORST and the terminal $v$ of the feed board control magnet 87. Similar jumper connections are made to establish the various connections between the different units as shown in Figure 9 to obtain operation for top ejection.

The following jumper connections are involved in the control circuit of Figure 9, the different terminals connected together in each jumper connection being enclosed in parenthesis:

(A—$m$), (B—R—$v$), (C—AE)
(D—BY—AR—AX—$j$—Q—F), (E—AG—$x$—$z$)
(G—AY—AF—S—$b$—AL—AP), (H—AB—AD)
(J—AK—AM)
(K—CB—AU—AC—AH—BL—$s$—N)
(L—AZ—$q$), (M—AN), (P—$u$), (T—$t$)
(W—BP—$h$), (X—$d$—$f$—AV—BN), (Y—$c$—BF)
(Z—$n$), ($a$—$r$), ($e$—$k$—BD), ($g$—AS), ($p$—AQ)
($w$—BH—AJ), ($y$—BK—U), (AT—BC—BE)
(BA—BG), (AA—V)

It will be understood that for top ejection operation, the lower comb plate 53 will be replaced by a blank plate of the same size but without the slots 53a. When the press is set up for top ejection as shown in Figure 9, the following sequence of operation takes place in each molding cycle when switch 78 is in its lower or "automatic" position:

1. At the end of the curing time, timer 90 times-out and contact 94 energizes valve winding 82 to open the press, the molded articles and flash formation remaining on the forces.

2. Opening of the press closes switch contacts K and L to energize valve magnet 84 to move the blank comb plate in over die plate 7.

3. When the lower comb reaches its "in" position switch EF opens and operates the ejector pins downwardly to strip the molded pieces and flash from the forces which drop onto the blank comb plate.

4. When the ejector ram moves down, switch contacts N and P close to energize valve magnet 86 and thereby move the upper comb plate 53 into the press, straddling the extended ejector pins.

5. When the upper comb plate reaches its "in" position, switch HG closes and energizes relay 96 which in turn energizes valve magnet 88 and operates the ejector ram to its upper position, thereby withdrawing the ejector pins, the comb serving to positively strip off any molding that remains on the pins.

6. When the ejector ram reaches its upper position, switch contacts Q and R are closed to energize valve magnet 87 to move the feed board into the press, the board serving to push both comb plates out of the press, the finished articles remaining on top of the blank comb plate.

7. When the feed board reaches its discharging position switch contacts $a$ and $b$ are closed to energize valve magnet 85 which further withdraws the blank or lower comb plate to its starting position, and the molded articles on this plate are scraped from the plate into the chute 69 by the transverse bar 57.

8. When the blank comb plate reaches its "out" position, switch contacts C and D are opened to interrupt the holding circuit of relay 96 which opens and de-energizes valve magnet 87 which permits the feed board to return to its loading position.

9. When the feed board reaches its loading position, switch contacts Z and Y are closed to energize the press closing magnet 83, thus starting another molding cycle.

When the press is to be operated for bottom ejection, a jumper plug like that shown in Figure 11 is inserted in the connector socket, but with jumper connections provided to produce the circuit of Figure 10. In this case the jumper connections are as follows:

(A—$m$), (B—P—AJ), (C—AE)
(D—CB—AR—BA—X—Y—AF—S—R—BP)
(E—BB), (F—AL), (J—AK—AM),
(K—BY—$g$—$j$—N—AN—$b$), (L—AX), (M—$p$)
(Q—AB—AD), (T—$w$), (U—$y$—Z—AU)
(V—AA), (W—$h$—BN), ($a$—$r$), ($c$—BF—$n$)
($d$—AV), ($e$—$k$—BD), ($f$—AS), ($q$—$s$—AG)
(V—AH—BH), ($x$—$z$—BK—AQ)
(AC—AY—AP), (AT—BC—BE)
(AW—BG—BJ)

For bottom ejection, the press is set up as shown in Figures 3 and 4, and the slotted lower comb plate 60 is employed and the upper comb plate 53 is not used. With the connections as shown in Figure 10, and with switch 78 in its "automatic" position, the following sequence of operation takes place in each molding cycle:

1. At the end of the curing time, timer 90 times-out and contact 94 energizes valve winding 82 to open the press, the molded articles remaining in the die cavities.

2. Opening of the press closes switch contacts K and L to energize ejector magnet 88 through contacts on relay 97, and the molded pieces are lifted out of the cavities on the lower ejector pins. Air blast magnet 89 is energized during the initial upward movement of the ejector ram before switch UV opens, thus providing a blast of air to blow away loose flash.

3. When the ejector ram reaches its upper position, switch contacts Q and R are closed to energize relay 96 which in turn energizes valve magnet 84 through switch contacts M and N to move the lower comb 60 into the press, straddling the ejector pins.

4. When the lower comb plate reaches its "in" position, switch EF opens and de-energizes relay 97 which de-energizes ejector magnet 88 to return the ejector pins, the molded pieces and attached flash formation remaining on the comb plate 60.

5. When the ejector ram reaches its lower position, switch contacts N and P close and energize relay 96 which in turn energizes magnet 87 through switch contacts TS to move the feed board into the press. The feed board pushes the lower comb plate and the molded pieces carried by it out of the press.

6. When the feed board reaches its discharging position in the press, switch $ab$ closes to energize valve magnet 85 to further withdraw the lower comb to its starting position. The molded pieces are scraped from the lower comb into the chute 69 by transverse bar 57.

7. When the lower comb reaches its "out" position, opening of switch contacts DC de-energizes relay 96 which de-energizes the feed valve magnet 87, and the feed board is returned to its loading position.

8. When the feed board reaches its loading position, switch contacts Z and Y are closed to energize the press closing magnet 83 through contacts AU and AV on switch 78 and through contact 95 on timer 90, through switch contacts A and B and through switch contacts N and P. The press then closes and starts another molding cycle.

In both Figures 9 and 10, the automatic cycling of the press is set into operation by moving control switch 81 to its down or "start" position where opening of contacts BN and BP de-energizes timer winding 91.

In the semi-automatic position of switch 78, with the switch 81 in its "start" position, the press will close and remain closed throughout the time set on the timer, and will then open automatically. Ejection in this case is obtained by moving switch 81 to the top position, and the feed board may be moved in or out by manually operating switch 80.

When switch 78 is in the upper or "hand" position, different operations of the press may be controlled manually by operating switches 79, 80 and 81, or by manually tripping the various automatically controlled switches which are operated by different movable parts of the press.

It has been noted that a charge of static electricity builds up in the feed device of the press during normal operation. This static charge prevents the measuring tubes of the feed board from completely discharging their loads into the mold cavities, as a coating of powder varying in thickness up to $\frac{3}{32}''$ is formed on the inner walls of the feed tubes. In addition, the intensity of the static charge varies in proportion to the distance each row of feed tubes must travel under the hopper full of powder during the feed stroke. The front row of tubes which travel under the loaded hopper the least distance will build up a negligible charge of static electricity, while the rear row of tubes which travel the greatest distance build up enough of a static charge to always retain a coating of powder on their inner walls approximately $\frac{1}{16}''$ to $\frac{3}{32}''$ thick. This troublesome condition is remedied by arranging a charge dissipating device in front of the container 28.

This device may take the form of a metallic bar 102 supported on the container 28 along the front edge thereof, just above feed board plate 40, and the lower face of this bar is coated with a charge dissipating substance such as polonium.

The problem of handling the flash which formations on molded pieces is a very important problem in the automatic molding art. In the present invention, this problem has been solved in a manner to insure that the pieces of flash are always formed in a definite location and are always removed from the mold cavities and are discharged from the press before new charges of molding material are supplied to the mold cavities. In Figures 12 to 14 I have shown the manner in which the flash is formed and ejected from the press for bottom-ejection operation of the press, and in Figures 15 and 16 I have shown the manner of forming and ejecting the flash for top-ejection operation.

In the molding art it is quite common to make the force of a slightly smaller diameter than the molding cavity to permit excess molding material to flow out of the cavity around the force when the article is being molded. This results in the formation of a cylindrical flash which may extend entirely around the molded article and the force, and it usually extends around a substantial part of the article. Such flash formations are difficult to remove from the press after each molding operation, and considerable difficulty is also experienced in removing the flash from the molded articles so that the finished articles are smooth and free of rough and jagged parts.

These difficulties are avoided in the present invention by forming the force so that it has close sliding fit with the wall of the die cavity, and provision is made for discharging the excess molding material through a flash forming channel formed in the outer surface of the force and communicating with the die cavity. This is illustrated in Figures 12 and 12a where the force 9a is arranged to enter the die cavity 7a with close sliding fit to form a molded article P, and a channel 9b is formed in the outer surface of the force 9a parallel with the axis of the force and communicating at its lower end with the die cavity 7a. The channel 9b is clearly shown in Figure 12a which is a top view of the force 9a. The channel 9b may be of any desired shape, but I prefer to form the channel of a section of a round bore, and preferably as a continuation of the bore in plate 9 for receiving an auxiliary knock-out pin 15a. As shown in Figure 12, the bore for the pin 15a partly overlaps the force 9a and forms the open channel 9b in the surface of the force.

The knock-out pin 15a is mounted on the same plate as the main knock-out pins 15 and extends slightly below the plate 9 as shown in Figure 12, that is, it extends down to a point where the flash Pa which is extruded from the channel 9b will come into contact with the lower end of pin 15a, it being understood that the flash bends outwardly from the force 9a in the manner illustrated in the drawing. By such an arrangement, the flash is always formed at a definite location below the knock-out pin 15a.

Figure 12 shows the article P being formed in the press and at the instant before opening of the press. Figure 13 shows the first stage in the opening of the press where the force 9a is being withdrawn from the die cavity while the knock-out pins 15 and 15a remain stationary to hold the molded piece P and the flash Pa in position with respect to the die plate 7. In Figure 14, the press has been opened completely, and the lower knock-out pins 21 have been operated to eject the molded piece P out of the die cavity and to raise the piece and the attached flash Pa to a position above the die plate 7 so that the lower stripper fork may be moved into position to strip the molded pieces from the lower knock-out pins. In this manner, the molded pieces, as well as the flash Pa, will be retained on the top of the stripper fork and will be discharged from the press after each molding cycle.

Figures 15 and 16 show the same arrangement of forming flash on molded articles which require top-ejection operation of the press. The arrangement is the same as in Figures 12 to 14 except that the lower knock-out pins are omitted and a suitable groove 9c is formed on the force 9a to provide an interlocking portion on the molded piece P to retain the piece on the force when the force is withdrawn from the die cavity, and a small groove 9d is formed in the channel 9b to provide an interlocking projection on the flash Pa to insure removal of the flash with the force when the force is withdrawn from the die cavity. Figure 15 shows the press in a closed position at the time the molded piece P is being formed, and Figure 16 shows the press in open position and just before the ejector pins 15 and 15a are operated to strip the molded piece P and the flash Pa from the force 9a. It will be understood that before the ejector pins are operated, the solid cover plate 60 is inserted to receive the molded pieces and flash and to prevent such parts from falling into the die cavities.

By the arrangement illustrated in Figures 12 to 16, the flash on the molded article is confined to one location and is connected by a small neck so that the flash may be easily removed from the article without difficulty. Also, by this arrangement, there is less likelihood of the flash being broken into small parts which would be difficult to prevent from entering the die cavities.

I claim:

1. In a molding press of the combination of a die plate provided with die cavities, a force plate provided with forces which retain molded articles thereon when the press is opened, each force being provided with a knock-out pin, a plate mounted at one side of said press and being movable into said press to cover said die cavities, means timed with the operation of said press for moving said plate into said press after said press opens, means timed with the movement of said plate for operating said knock-out pins to eject the molded articles from said forces after said plate is in covering position, a stripper comb mounted outside of said press and being movable into said press in stripping relation with respect to said knock-out pins, means for moving said comb into stripping position after said knock-out pins have been operated, means timed with the operation of said comb for withdrawing said knock-out pins after said comb reaches stripping position, and means for thereafter moving said plate out of said press.

2. A molding press according to claim 1 wherein said means for moving said plate out of said press comprises a feed board mounted on the opposite side of said press from the normal position of said plate and being movable into said press to deposit molding material in said cavities, said feed board being aligned with said plate and serving to push said plate out of said press on its feeding stroke.

3. A molding press according to claim 2 and including means timed with the operation of said feed board for continuing the outward movement of said plate after said feed board reaches its discharging position, and a fixed scraper element mounted above said plate for scraping the molded articles off of said plate during such further movement.

4. A molding press according to claim 3 and including means timed with the outward movement of said plate away from said feed board for initiating the return movement of said feed board when said plate reaches its normal position.

5. In a molding press the combination of a die plate provided with die cavities, a force plate provided with forces, one of said plates being provided with knock-out pins, a stripper comb mounted outside of said press and being movable into said press in stripping relation with respect to said knock-out pins, a feed board mounted on the opposite side of said press from the normal position of said comb and being movable into discharging position in said press, means timed with the opening of said press to operate said knock-out pins, means timed with the operation of said knock-out pins to move said comb into stripping position after the knock-out pins have been operated, means timed with the operation of said comb for withdrawing said pins when said comb is in stripping position, means timed with the withdrawal of said pins for moving said feed board into discharging position in the press, and means for moving said comb out of stripping position by the inward movement of said feed board.

6. A molding press according to claim 5 wherein said knock-out pins are provided on said die plate, including means timed with the operation of said feed board for moving said stripper comb away from said feed board after said board reaches its discharging position, and a fixed scraper element mounted above said comb for scraping the molded articles off of said comb as the comb moves away from the feed board.

7. A molding press according to claim 5 wherein said knock-out pins are provided on said force plate, and including a cover plate mounted beneath said comb and being movable into press to cover said die cavities, and means timed with the opening of said press for moving said cover plate into covering position after the opening of said press and before the operation of said knock-out pins.

8. In a molding press the combination of a lower mold plate, an upper mold plate, means for moving the upper plate to open and close the press, a double-acting ejection cylinder having an ejection ram, means carried by said ram for supporting a lower knock-out plate below said lower mold plate, an upper knock-out plate for said upper mold plate, means normally holding said upper knock-out plate in raised position with respect to said upper mold plate, and pull rods for pulling down said upper knock-out plate by said ejection ram.

9. In a molding press the combination of a lower mold plate, an upper mold plate, means for moving the upper plate to open and close the press, an ejection cylinder having an ejection ram located below said lower mold plate, means normally maintaining said ram in its upper position, a knock-out plate carrying knock-out pins for said upper mold plate, means normally holding said knock-out plate in raised position with respect to said upper mold plate, pull-down rods connected to said knock-out plate and passing freely through holes formed in parts of said ejection ram, and stops carried by said rods below said ram parts a distance equal to the opening movement of said press.

10. In a molding press the combination of a lower mold plate, an upper mold plate, means for moving the upper plate to open and close the press, an ejection ram, electrically controlled means for moving said ram from a lower position to an upper position, a comb plate mounted outside of said press and being movable into said press adjacent said upper mold plate, a second plate mounted outside of said press and being movable into said press adjacent said lower mold plate, individual electrically controlled means for moving said plates into said press, a normally open switch arranged to be closed by said ejection ram in its lower position, a second normally open switch arranged to be closed by said ejection ram in its upper position, a third normally open switch arranged to be closed by said upper mold plate when the press is open, a connector socket having a plurality of contact sockets, individual connections from each of said control means and each of said switches to individual contact sockets in said connector socket, a plug for said connector socket having a connector pin for each of said connector sockets, and jumper connections connecting the pins in said plug for energizing the control means of said lower movable plate through said third switch, for energizing the control means of said comb plate through said first switch, and a second plug for said connector socket having jumper connections for energizing said ram control means through said third switch and for energizing the control means of said lower movable plate through said second switch.

11. A feed device for a molding press comprising a feed board, a movable carriage supporting the said feed board and being arranged to move said board from a loading position beneath a container for molding material into feeding position within the press, said feed board having a plurality of measuring cavities and including an apertured stop plate normally closing the lower end of said cavities and being shiftable with respect to said board to release the measured charges from said cavities, an elongated tail piece extending rearwardly from said stop plate, a latch device mounted on a fixed support and arranged to have locking engagement with said tail piece, and an operating member adjustably mounted upon said carriage and arranged to actuate said latch when the apertures in said stop plate come into registry with the die cavities of said press.

12. In a molding press the combination of a feed board mounted for movement from a loading position beneath a container of molding material into discharging position within the press, and an apertured stop plate normally closing the lower ends of the measuring cavities in the board, stationary latch means positioned adjacent the path of travel of said stop plate and being arranged to latch said stop plate against movement, and actuating means for said latch movable with said feed board and arranged to actuate said latch when said board has advanced to a predetermined point on the forward movement of said board and to release said latch when said board reaches said point on its return movement, said actuating means being adjustable in position along the path of travel of said feed board.

13. In a molding press the combination of a die plate provided with die cavities, a force plate provided with forces which retain molded articles thereon when the press is opened, each force being provided with a knock-out pin, a plate mounted at one side of said press and being movable into said press to cover said die cavities, means timed with the operation of said press for moving said plate into said press after said press opens, means timed with the movement of said plate for operating said knock-out pins to eject the molded articles from said forces after said plate is in covering position, a feed board mounted on the opposite side of said press from the normal position of said plate and being movable into said press to deposit molding material in said cavities, and means for moving said plate out of the press by the inward movement of said feed board.

14. A molding press according to claim 13 and including means timed with the operation of said feed board for moving said plate away from said feed board after said board reaches its discharging position, and a fixed scraper element mounted above said plate for scraping the molded articles off of said plate as it moves away from the feed board.

15. A molding press according to claim 13 and including a stripper comb normally positioned outside of said press and being movable into stripping relation with said knock-out pins, and means timed with the operation of said press for moving said comb into stripping position after operation of said knock-out pins.

16. In a molding press the combination of a die plate provided with die cavities, a force plate provided with forces arranged to enter said die cavities, a plate mounted at one side of said press and being movable into said press above said die cavities, means timed with the operation of said press for moving said plate into said press after said press opens, means timed with the movement of said plate for depositing molded pieces upon said plate after said plate is in position above said cavities, a feed board mounted on the opposite side of said press from the normal position of said plate and being movable into said press to deposit molding material in said cavities, and means for moving said plate out of the press by the inward movement of said feed board.

17. A molding press according to claim 16 and including means timed with the operation of said feed board for moving said plate away from said feed board after said board reaches its discharging position.

18. In a molding press according to claim 1 wherein each force is provided with a flash-forming channel on the outer surface thereof and including a flash knock-out pin mounted for operation with said first-mentioned knock-out pin and arranged to remove the flash from said channel.

19. In a molding press, the combination of a die plate having a die cavity, a force arranged to enter said die cavity to mold an article, said force having formed on the outer surface thereof a flash-forming channel, a first knock-out pin for stripping said article from said force, and a second knock-out pin mounted in fixed relation to said first knock-out pin for simultaneously stripping the flash from said channel.

20. A molding press according to claim 5 wherein said knock-out pins are provided on said die plate, and including means timed with the operation of said feed board for moving said stripper comb away from said feed board after said board reaches its discharging position and including means timed with the outward movement of said comb away from said feed board for initiating the return movement of said feed board when said comb reaches its normal position.

21. A molding press according to claim 5 wherein said knock-out pins are provided on said force plate and including a cover plate mounted beneath said comb and being moveable into said press to cover said die cavities, means timed with the opening of said press for moving said cover plate into covering position after the opening of said press and before the operation of said knock-out pins, means for moving said cover plate out of said press by the inward movement of said feed board, means timed with the operation of said feed board for continuing the outward movement of said cover plate after said feed board reaches its discharging position, and means controlled by said cover plate in its outermost position for initiating the return movement of said feed board.

WILLIAM STRAUSS.

REFERENCES CITED

The following references are of record in the file of this patent:

UNITED STATES PATENTS

| Number | Name | Date |
| --- | --- | --- |
| 644,811 | Sylvester | Mar. 6, 1900 |
| 767,872 | Davies | Aug. 16, 1904 |
| 2,227,966 | Emsley | Jan. 7, 1941 |
| 2,256,081 | Farley | Sept. 16, 1941 |

OTHER REFERENCES

Ser. No. 337,675, Schmidberger (A. P. C.), published Apr. 27, 1943.